United States Patent
Cassidy et al.

(10) Patent No.: US 6,249,883 B1
(45) Date of Patent: Jun. 19, 2001

(54) SYSTEM AND METHOD FOR MONITORING DOMAIN CONTROLLERS

(75) Inventors: James Cassidy; Edward D. Harris, both of Tempe; Gilbert M. Kirkpatrick, Fountain Hills, all of AZ (US); Michael K. Owings, Covington, LA (US)

(73) Assignee: NetPro Computing, Inc., Scottsdale, AZ (US)

( * ) Notice: Subject to any disclaimer, the term of this patent is extended or adjusted under 35 U.S.C. 154(b) by 0 days.

(21) Appl. No.: 09/106,935

(22) Filed: Jun. 29, 1998

(51) Int. Cl.$^7$ .................................................. G06F 11/00
(52) U.S. Cl. .................. 714/42; 714/47; 714/48
(58) Field of Search ..................... 714/4, 25, 39, 714/47, 48, 49, 50, 55, 57

(56) References Cited

U.S. PATENT DOCUMENTS

| | | | |
|---|---|---|---|
| 5,367,670 | * | 11/1994 | Ward ..................................... 714/47 |
| 5,396,613 | * | 3/1995 | Hollaar .................................. 714/4 |
| 5,774,645 | * | 6/1998 | Beaujard ............................... 714/25 |
| 6,006,016 | * | 12/1999 | Faigon .................................. 714/48 |
| 6,098,181 | * | 8/2000 | Hamilton, II ........................ 714/25 |

* cited by examiner

Primary Examiner—Robert Beausoleil
Assistant Examiner—Bryce P. Bonzo
(74) Attorney, Agent, or Firm—William R. Bachand; Squire, Sanders & Dempsey L.L.P.

(57) ABSTRACT

A computer system having servers and coupled to a network supports a distributed directory and a directory monitor service. The monitor service may include a domain analyzer and domain model at each of several servers; and, a network administrator and network model on an enterprise server of the network. A domain analyzer monitors the network to detect messages associated with directory operations initiated or performed by the same or another server in the network. Methods performed by one or more servers predict system and network failures. One such method includes receiving a first message, receiving a second message, and conditionally raising an alert condition. The first message indicates the beginning of a replication of a portion of a directory and indicates a beginning time. The second message indicates completion of the replication of the portion of the directory and indicates an ending time. An alert condition is raised in response to comparing a first threshold value and the difference between the ending time and the beginning time. In other words, if the duration of a replication operation on the distributed directory takes longer than expected, an alert condition is raised.

47 Claims, 9 Drawing Sheets

SYSTEM AND METHOD FOR MONITORING DOMAIN CONTROLLERS

FIELD OF THE INVENTION

Embodiments of the present invention relate to computer systems that utilize network monitoring for improving performance and to methods for detecting instability in a system that includes a computer network.

BACKGROUND

Many conventional devices include a built in computer whose sole purpose is to operate a single application program from a single 10 dedicated store of information, for example a so called palm-top address register. A programmer enjoys considerable freedom to develop the operating system and application program for such a device because the number of uncertainties in the operating environment are few and allowances for each can be made and tested. The performance of the software as a whole can be optimized.

The continuing trend toward faster computers has allowed system designers to accomplish modest gains in the complexity of application programs while making enormous strides in performing background overhead tasks of which the user may be completely unaware. Such background tasks are no longer mere time-shared application programs but are members of so called services. A service is a set of member programs written for cooperation on a network of computers. Each computer is a node of the network. Each member generally operates on a physically separate node and communicates with other members of the set to accomplish a distributed processing objective. Examples of such objectives include sharing information, sharing access to a peripheral input or output device, and sharing other services.

The basic unit of information storage is the computer file and, for executable information, the program object. To share information, a conventional service at a minimum employs a naming convention for files, accesses a file by its name, and makes a copy of the contents of the file onto a destination node for efficient use (reading/writing) by the member at a requesting node. While a computer program is a file or group of files, a computer program in operation is better understood as a process that sends and receives messages. Sharing a service is conventionally accomplished either by copying the requisite program files to the requesting node, or by employing a naming convention (e.g. an application program interface) and communicating messages (i.e. passing parameters and results) between members that make up a distributed service. Such a program (a member of a set) is no longer thought of as a process but as a collection of objects, each object being a communicating process.

Traditional computer systems have managed information storage as a list of named files on a named physical device. Conventional networks of computers provide the service user with an independence from having to know the name of a physical device to obtain access to a named file. Still other conventional systems allow the service user an independence from knowing even the name of the file, as for example, when using a browser service to study a topic on the World Wide Web. In a similar development, conventional object resource brokering permits objects to cooperate without foreknowledge of names and physical locations. The market continues to demand this flexibility that the user of such distributed data storage systems and distributed processing systems enjoys.

Unfortunately, computer networks on which file copies and messages are communicated are subject to frequent change due to expansion (e.g., equipment upgrades), reconfiguration, and temporary interference (e.g. line outages). Further, methods and structures for sharing information and sharing services are subject to change as well. These sources of unreliability of the network, and potential incompatibility in methods and structures, greatly multiply the difficulty in developing reliable software for hosting old services on new computers and network devices, and for hosting new services. Due to the rapid development of ever more capable communication hardware and systems software, few application program developers care to add network tests, network performance monitoring, or network fault analysis to the applications they write, but rather build the application or the new service on the basis that the network is being managed by some other software. This assumption appears almost ludicrous in light of the unpredictable intensity and combination of tasks a computer network is expected to perform as more users rely on sharing for their business objectives.

Conventional network management application programs cannot keep pace with the development of hardware and systems software. Methods used for conventional network management occupy a significant portion of the network's messaging capability by transferring information to other computers of the network for analysis. Users are, therefore, increasingly exposed to risks of loss of data, waste of personally invested time and materials, sudden disruption of distributed processing, and occasionally being unable to provide to others what was expected based on past experience with the same computer system.

There remains a need for network monitoring services better matched to the computer system being monitored and for computer systems having improved monitoring services for reducing the risk of interference that occasionally prevents reliable access to the data and operation of services which the computer system was intended to provide.

SUMMARY

A computer network of the present invention includes any computer network having a distributed directory, specifically where the computer network performs a method for predicting a failure in the computer network, the method including the steps of receiving a first message, receiving a second message, and conditionally raising an alert condition. The first message indicates beginning of replication of a portion of a directory, and a first time. The second message indicates completion of replication of the portion of the directory, and a second time. An alert condition is raised in response to comparing a first threshold value and the difference between the second time and the first time.

According to a first aspect of such a system, the duration of a directory replication operation is used to predict a condition of high risk of incorrect operation of the computer system. For example, a network failure may be responsible for unexpected delay in the replication operation. If delay persists or increases, unexpected operation may result. For instance, when use is requested of a resource of the computer network and the configuration of the resource is not updated as intended by the replication operation then that use may result in a failure of the computer system. Such a failure was predicted by the excessive duration of the replication operation.

A programmed data storage device, of the present invention, includes indicia of a method for predicting a failure in a computer network having a distributed directory. The method includes the steps of monitoring changes made to a portion of the directory to determine a duration of a replication operation, and raising an alert condition in response to comparing the duration to a limit.

DETAILED DESCRIPTION OF THE PREFERRED EMBODIMENTS

Office computer systems ordinarily include a computer network that couples several workstation computers together with shared peripheral equipment. Sharing of files is supported by so-called peripheral computers called servers, each having a number of high capacity data storage devices, such as nonvolatile disk systems. Each workstation computer and each server computer performs a program called an operating system, for example, WINDOWS NT, which is a trademark for an operating system marketed by Microsoft Corporation. Of the many services performed by an operating system, the sharing of information and services is simplified when users and user application programs are permitted access for sharing without having to specify the physical path or device name associated with a stored copy of the information or service (program file) desired. Further simplification is obtained, as computer networks are coupled together when, users are permitted access for sharing the resources, peripherals, information, and services which are local to other networks and servers in a so-called flat namespace or directory.

A directory, in the context of a network, is primarily an index that correlates a logical name for an object (e.g. a data file, a program component, a printer, a disk drive) to its physical address used for obtaining physical access to the object. A computer network of the present invention, is a computer network having any conventional distributed directory. An operating system may provide a directory service and respond to requests to access the contents and configuration of the directory. For example, as will be discussed in greater detail with reference to FIG. 3, a file may be created and its contents stored via the directory; and, a peripheral (or user identification) may be added to the computer network with its characteristics and settings stored as a change to the configuration of the directory. The configuration itself may be an object stored as a file (or indexed set of files) via the directory.

Figure 1:
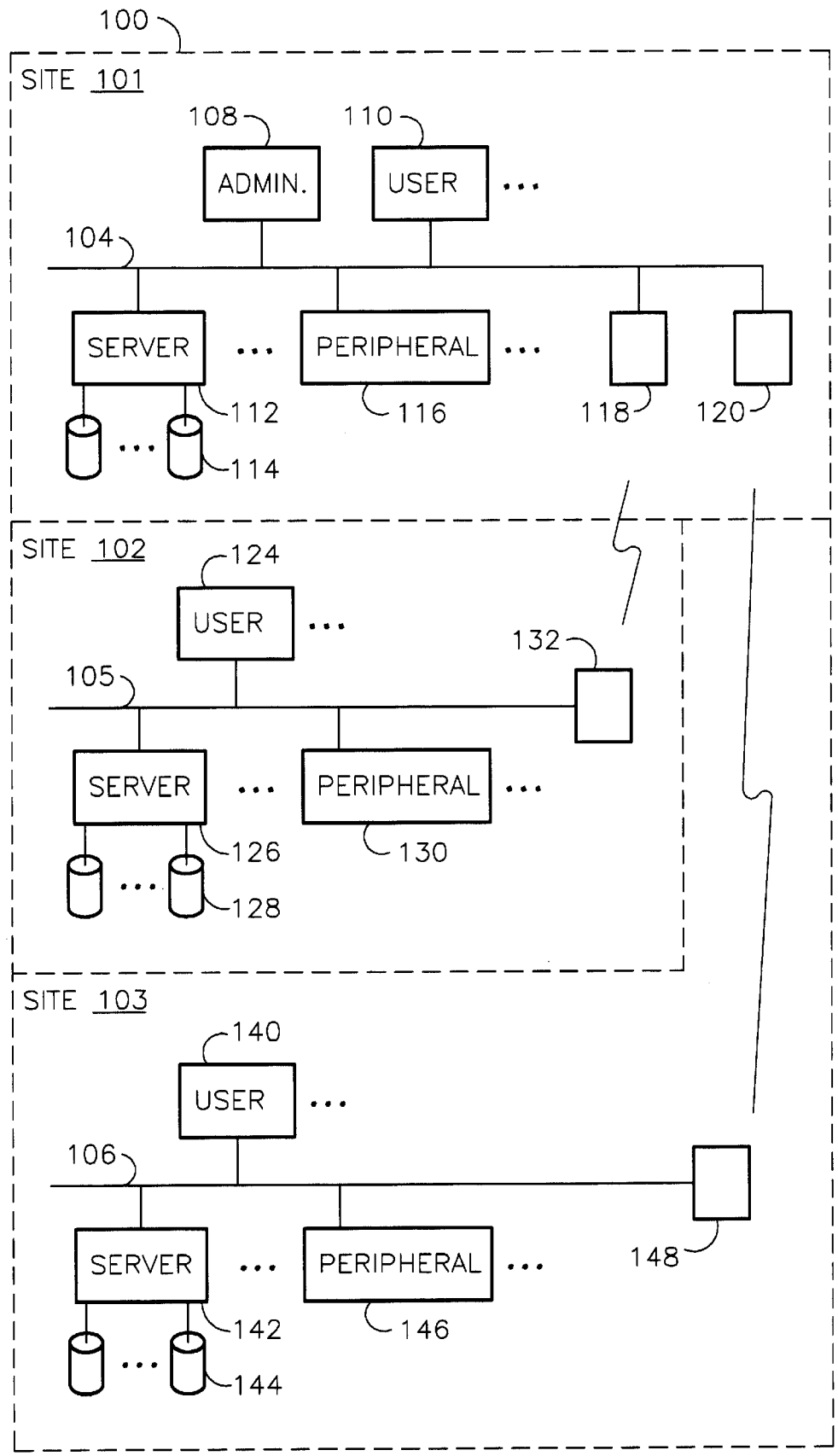
FIG. 1 is a functional block diagram of a computer network having shared information and shared services according to aspects of the present invention.

A computer network of the present invention is any computer network having a distributed directory and a directory monitor service that predicts failure of the computer network according to aspects of the present invention. For example, computer network 100, of FIG. 1, includes equipment at three sites (e.g. buildings, geographic areas, or regions separated by distance or physical boundaries). Each site includes a subnetwork, namely, 104, 105 and 106 respectively, coupled by signals that cross site boundaries. Note that each subnet 104–106 may have multiple servers.

Site 101 includes administrative workstation 108, user workstations shown generally as 110, server 112 having disk systems shown generally as 114, other peripherals shown generally as 116, and couplers 118 and 120. Site 102 includes user workstations 124 (which may be identical to workstations 110), server 126 having disk systems 128 (which may have identical capabilities to server 112 and disks 114), peripherals 130, and coupler 132. Site 103 includes user workstations 140 (which may be identical to workstations 110), server 142 having disk system 144 (which may have identical capabilities to server 112 and disks 114), peripherals 146, and coupler 148.

Each workstation 108, 110, 124, and 140 may be any conventional desk top computer having any network interface electronics to couple each workstation independently to a subnetwork and possibly including local nonvolatile memory (disk systems), keyboard, and a display device. Each workstation includes a conventional operating system such as WINDOWS NT. Administrative workstation 108 performs a client process of the present invention for network administration as discussed, for example, with reference to FIG. 4. User workstations perform conventional application programs that cooperate with a directory administrator as discussed for example with reference to FIG. 3.

Each server 112, 126, and 142 may be any conventional server that includes a conventional operating system such as WINDOWS NT and any network interface electronics to couple each server independently to a subnetwork. In addition, each server may perform a domain analyzer service according to aspects of the present invention, for example, as discussed with reference to FIG. 4. At least one server at each site in computer network 100 also performs a site administrator service according to aspects of the present invention, for example, as discussed with reference to FIG. 4.

Peripherals 116, 130, and 146 may be any conventional devices including general purpose input/output devices (e.g. scanners and printers) and special purpose input/output devices (e.g. instrumentation and controllers).

A computer network is made up of network links that are dedicated or temporary. A network link is any data communication mechanism (hardware plus software) that permits cooperation of subnetworks, servers, workstations, peripherals, and combinations of these devices. For example, couplers 118, 132, and 120, 148 cooperate as pairs to couple subnetwork 105 to 104 and 106 to 104, respectively. These couplers may be any conventional devices including, for example, telephone line modems, satellite link equipment, wide area network repeaters, routers, etc. Subnetworks 104–106 cooperate as a local area network, a wide area network, or a network compatible with the World Wide Web.

The directory for a computer network of the present invention is distributed. For example, each site of computer network 100 includes one or more servers that perform a portion of the directory service and are so designated domain controllers (DCs). In other words, a domain controller maintains a portion of the directory. In addition to portions of the directory being stored on independent disk systems such as disk systems 114, 128, and 144, multiple copies of portions of the directory are stored among these physical devices for two performance reasons. First, because most functions of computer system 100 for supporting users will require access to data and services via the directory, a copy of the portion most likely to be accessed is kept locally to avoid delays associated with conventional coupler devices. Second, in the event of a network failure, operation of computer system 100 may continue in a reduced capability fashion. Network failures include loss of access to a portion of the directory as caused for example by physical failure of a disk system, a server, a coupler, a communication medium (e.g. telephone link), or logical failure caused by inconsistent or incomplete writing of information used by a directory service.

Operation of a computer network according to aspects of the present invention includes methods for predicting network failure. By anticipating network failure, a computer network may provide services with fewer interruptions, with shorter interruptions, and with planned rather than unexpected interruptions. Such a computer network solves the problems described above and provides substantial economic benefit to the owners, operators, and users of the computer network. Although hardware failure may be predicted by any conventional techniques, the consequences of hardware failures (soft failures and hard failures) are likely to become evident in inconsistencies in the directory, which may pass undetected by the directory services. A computer network according to aspects of the present invention includes mechanisms (hardware or software) for monitoring all portions of the directory. Such monitoring is accomplished with little reliance on and little interference with conventional network operations used by the directory service.

A directory used in conjunction with a computer network of the present invention may be organized in any flat or hierarchical manner. The directory service for a particular computer network may have an organization that differs from the organization presented to users and other services of the computer network. For example, directory 200 of FIG. 2 includes one or more levels, each level providing a context within which an abbreviated name may be resolved to locate an intended object. The upper most levels require specification of all lower levels beneath them, yet the lower levels when used with a conventional directory service, take default values based on the context in which the abbreviated (or relative) name is used. Each directory includes one or more trees; each tree includes one or more domains; each domain includes one or more containers; each container includes one or more objects. Finally, each object has associated with it, via the directory, any number of attributes.

Figure 2:
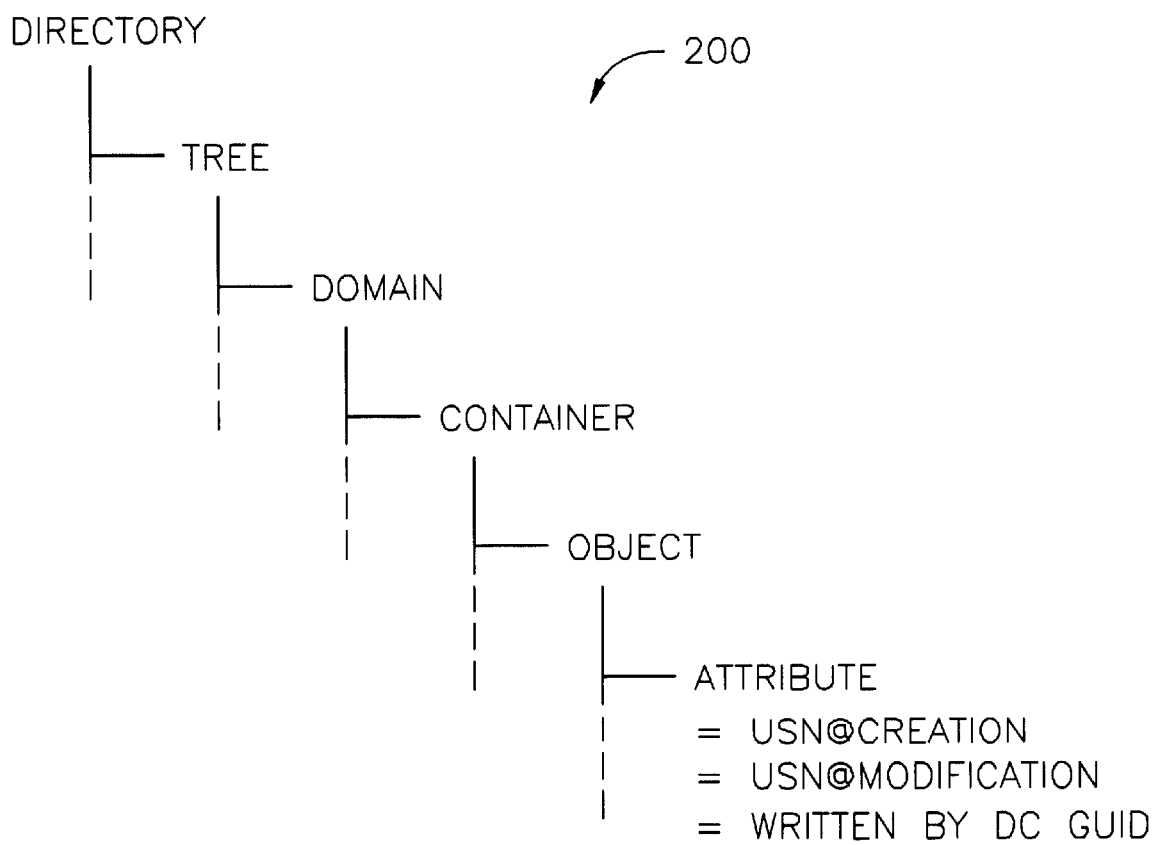
FIG. 2 is a diagram of relationships among items of stored information.

Several attributes provide support for monitoring (by a domain analyzer) of the network operations performed by a directory service. For example, when an object is created or modified, a conventional directory service assigns new values to the directory entry for that object. The new values include values for attributes that perform the function of an unique update sequence number (USN). For example, the directory service of WINDOWS NT provides an uptodatedness vector that is available to all domain controllers. The date and time that a update sequence number was assigned may be determined by a search of vectors and their values indexed by USN. As shown in FIG. 2, attributes include USN@CREATION, USN@MODIFICATION, and an identifier of the domain controller responsible for creation or modification. The domain controller in this example is identified by a value called a global unique identifier (GUID) assigned by the network administrator process to be discussed with reference to FIG. 4.

Figure 3:
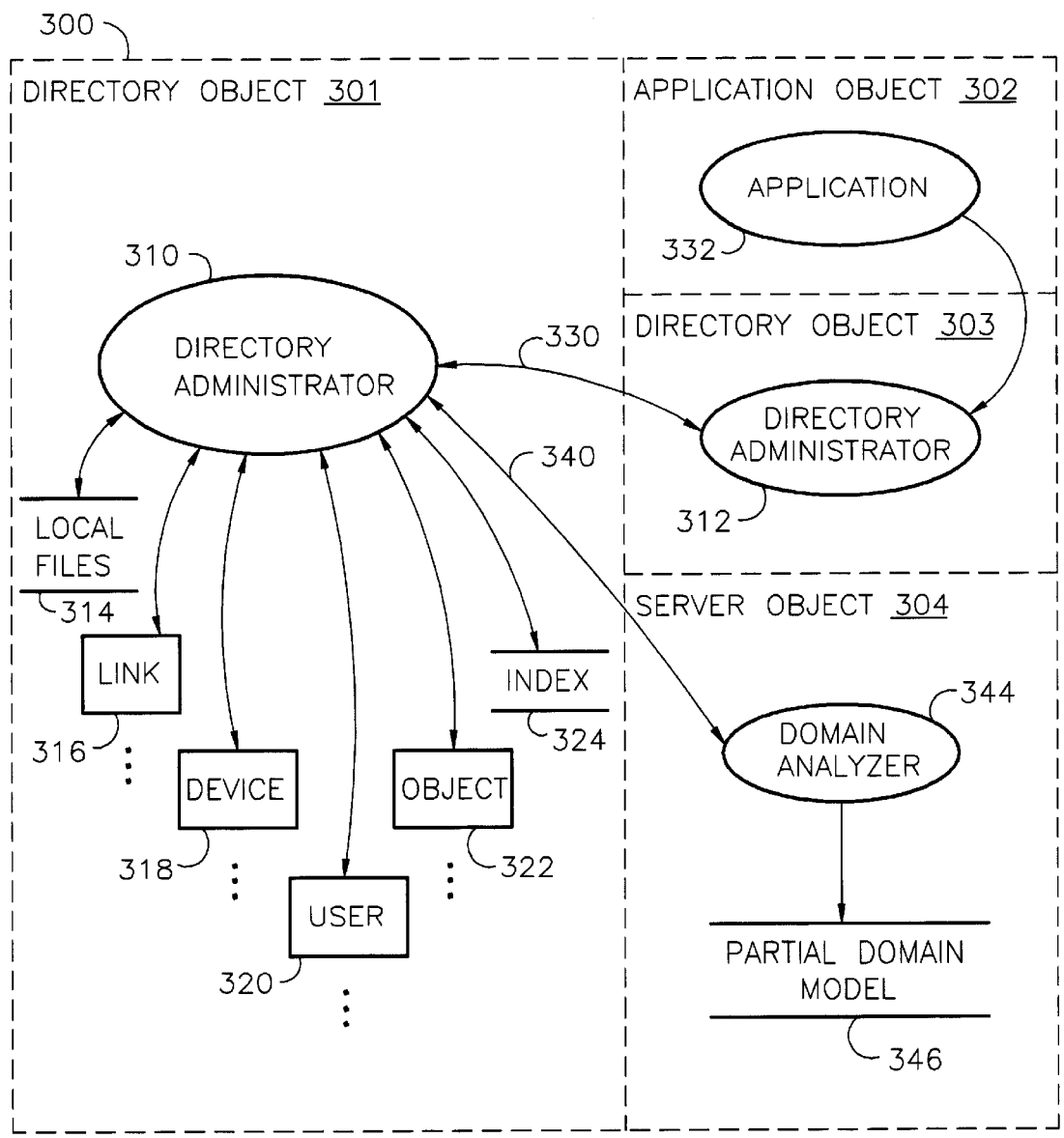
FIG. 3 is a data flow diagram for illustrating the cooperation of portions of server operating systems called directory administrators.

The services performed by a computer network of the present invention may be developed with any procedural, object-oriented, or other conventional computing paradigm and language. For example, four objects (in the object-oriented paradigm) cooperate as shown in FIG. 3. A directory service, in this example, is performed possibly on two separate servers by two directory objects (each encapsulating data and methods for sending and receiving messages). Directory objects 301 and 303 respectively administrate two portions of the directory of computer network 100. Directory objects 301 and 303 are identical except as to the underlying data they administer. Each directory object is a part of an operating system.

A directory object is any process that performs directory operations. A directory operation is any operation that affects the logical configuration of any object in a computer network, including, for example, creating, reading, writing, (possibly) executing, attaching/removing a physical device, redirecting (as in configuring a router), and the like. In addition, directory operations include manipulating logical relationships including appending a domain to a tree, creating/renaming/deleting a container, and the like. Because these operations will have an effect on two or more portions of a completely redundant distributed directory, all such operations involve messaging on the network to accomplish consistency among copies of portions of the directory. For example, links 330 and 340 are supported as network links.

The items referred to by a directory object include any description of a device, user, service, or process that uses any portion of the computer network. These items include, for example, local files 314, links 316 to other external networks (such as the World Wide Web), input/output devices and other peripherals 318, users 320 (including log in names, passwords, and privileges), objects 322, and an index 324. Objects 322 include the conventional functional units of processing that may cooperate with other objects according to configuration parameters kept in the directory so as to implement services or other conventional distributed processing application programs. Directory object 301 may (but usually does not) contain contents of local files 314, but, as with other items 316–322, directory administrator 310 maintains in index 324 an up to date description of all respective configuration details. Configuration details include at a minimum information for resolving any logical to physical relationship necessary for access to the item.

In operation, when an application object 302, operating for example, in a different domain than directory object 301, requests access to a device 318, the request is conventionally resolved by directory administrator 312 of directory object 303. Directory administrator 312 determines from a local copy of a portion of the directory of computer network 100 that directory object 301 maintains configuration details for device 318. Directory administrator 310 on request from directory administrator 312 identifies the object to be used to communicate with device 318 (e.g. a printer driver) and supplies such information as needed from index 324 to directory administrator 312. Directory administrator 312 then couples application 332 to the appropriate object 322 (or to device 318) to satisfy the request. If index 324 and the respective index of directory object 303 (not shown) are not up to date, a configuration change (perhaps initiated by another directory object) may not be accounted is for. The expected operation of application object 302 in that case may not be fulfilled, constituting one type of network failure.

To avoid such a network failure, a computer network according to aspects of the present invention includes a monitor service. A monitor service is any service that monitors changes to the index of directory objects on the network. For example, server object 304 is one component of a monitor service configured to monitor directory operations performed by directory object 301. Server object 304 includes domain analyzer 344 and partial domain model 346. In operation, domain analyzer 344 requests a subscription to index entries for all directory operations. In the event of a directory operation, directory administrator 310 sends a message to domain analyzer 344 that identifies the entries in index 324 that have been affected by the directory operation. In a variation, directory administrator 310 sends a message periodically and accumulates changes between messages to limit use of link 340. Such messages suitably conform to any conventional directory access protocol such as X.500, DAP, or LDAP.

On receipt of notice that index 324 has been changed, domain analyzer 344 updates model 346 that describes the contents and changes to index 324.

A model of a directory according to aspects of the present invention includes any object, file, or data structure that describes entries in the index of a directory object. For example, in one variation of partial domain model 346, every entry is described for a directory object responsible for the portion of the directory being a selected tree (see FIG. 2). Items in the partial domain model describe the tree itself, every domain in the tree, every container in each domain, every object in each container, and copied values from one or more attributes of every object. In addition, other attribute values are kept for items at each level. A description includes, for example, the name of the item (complete physical name, and/or selected relative names), the USN at creation, the USN at last modification, the GUID of the domain controller responsible for the last modification, and suitable historical values such as the USN at modifications prior to the last modification. Other values may be needed to dampen cyclic or infinite model update operations.

In one embodiment, a monitor service includes components on three types of servers: an enterprise server that provides a graphical user interface (GUI) for administration of the computer network by a human operator, a site server at every site of the computer network, and a domain controller (server) responsible for each portion of the directory as distributed per the configuration defined in the directory by the directory service.

Figure 4:
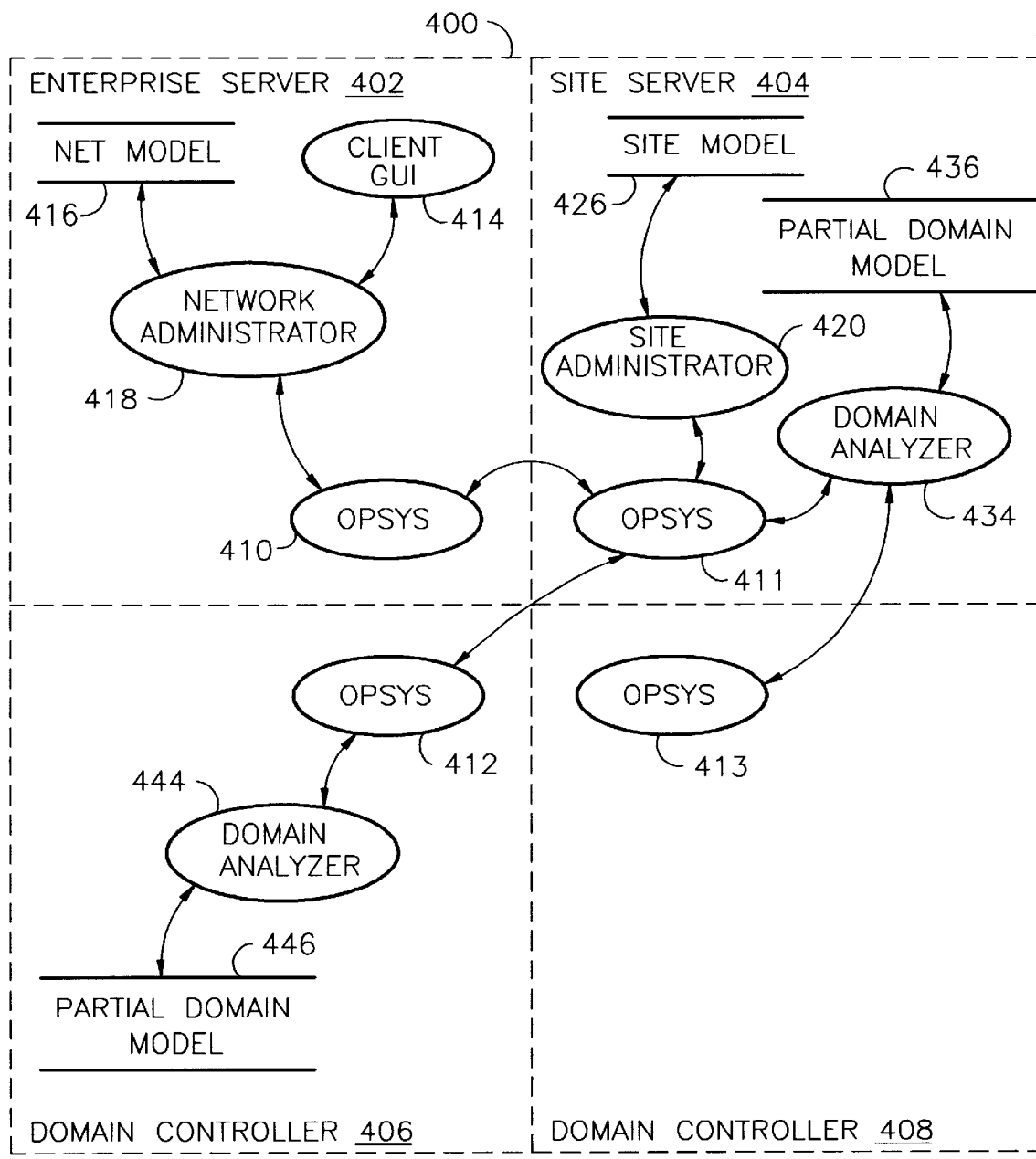
FIG. 4 is a data flow diagram for processes of the present invention that provide shared information and shared services.

For example, with reference to FIG. 4, computer network 100 suitably includes enterprise server 402, site server 404, domain controller 406, and domain controller 408. Each server performs a respective operating system 410–413. Each operating system suitably includes a directory object as described above with reference to FIG. 3 and suitable conventional communication services. All opsys 410–413 communicate with each other for purposes of maintaining the distributed directory on links not shown. For purposes of monitoring, opsys 410 communicates with opsys 411, and Opsys 411 communicates with opsys 412.

Enterprise server 402 performs network administrator service 418 and client GUI 414. Network administrator 418 maintains a comprehensive model of the entire directory of computer network 100 in net model 416. Net model 416 is a model as described above and suitably contains initial configuration information for initializing site models and partial domain models throughout computer network 100. Network administrator 418 communicates with client GUI 414, opsys 410, and accesses net model 416.

Site server 404 includes site administrator 420, and site model 426. Site model 426 is a model as described above and suitably contains initial configuration information for all partial domain models at the site 404. Site administrator 420 communicates with opsys 411, and accesses site model 426. In addition, site server 404 performs domain analyzer 434 and maintains for it partial domain model 436 so that domain controller 408 does not (for any particular reason) support a domain analyzer. Domain analyzer 434 communicates with opsys 411, and opsys 413 and accesses partial domain model 436.

Domain controller 406 performs domain analyzer 444 and maintains partial domain model 446. Domain analyzer 444 communicates with opsys 412 and accesses partial domain model 446.

In operation, monitor components 418, 420, 434, and 444 cooperate, inter alia, to maintain net model 416 and to predict network failures. To maintain net model 416, each domain analyzer 434 and 444 subscribes to information from the directory object of the respective opsys 413 and 412. As described above, directory operations are analyzed to suitably affect additions and changes to the respective partial domain model 436 and 446. In addition, domain analyzers perform, inter alia, the following functions programmed using conventional object oriented design methodologies including encapsulation to define scope of references, functional overloading, polymorphism, and inheritance. Each domain analyzer monitors its host server performance by monitoring (i.e. keeping current and historical values) performance counters (e.g. cache hit rate, memory utilization, system volume utilization, directory volume utilization, CPU utilization, number of pending requests in service queues, etc.), event logs (e.g. storage protocols including the global catalog (GC), communication protocols including a World Wide Web domain name service (DNS) and low-level Ping, other unexpected returns from input/output device drivers, etc.), changes to the registry (i.e. describing the configuration and versions of programs permitted to run on the server), and similar performance measures of services performed by the host server. (A Ping is a conventional communications request for a response.) Further, each domain analyzer monitors the configuration and performance of directory services and associated communication services including for example monitoring the number of operations (e.g. directory operations by type of operation) in a predetermined period of time. Each domain analyzer also performs analytical and probabilistic computations combining any or all monitored data to selectively raise suitable alert conditions, for example, as described in Table 1. Each domain analyzer may maintain histories of monitored values and determine alert conditions in response to any combination of current and historical values.

By monitoring locally, domain analyzer 444 monitors opsys 412 and domain controller 406 with less network traffic than domain analyzer 434. Communication between components of the monitor is preferably event driven, as opposed to polled, to reduce network utilization and to minimize the possibility that intercomponent communication will fail prior to detecting a network failure.

TABLE 1

| ALERT | DESCRIPTION |
|---|---|
| AlertTypeCantPingDC | By site admin. as a result of periodic test; allows measurement of response time; server may be nonfunctional; network link may be down |
| AlertTypeLameDelegation | By network/site administrator; DNS hierarchy is out of date due to server moved from one domain to another |
| AlertTypeLostFoundObjectPresent | By network admin.; when two DCs attempt to move the same object, one will receive notice that the object cannot be found where it was expected |
| AlertTypeLostDomainFSMO | By network admin.; a floating single master operation (a token) of the domain is lost |
| AlertTypeLostRIDFSMO | By network admin.; a token for relative identifier allocation has been lost |
| AlertTypeMultRIDFSMO | By network admin.; multiple tokens appear to exist |
| AlertTypeTransClosure | By network admin.; transitive closure being lost, replication may not be able to be performed |
| AlertTypeDownlevelDC | By network admin.; a WINDOWS NT 4 domain controller has been identified |
| AlertTypeGlobalGroups | By network admin.; a list of directory objects exists which spans more than one domain |
| AlertTypeConfigInconsistant | By network admin.; one or more different copies of the configuration container exist |
| AlertTypeRepLatHigh | By network/site admin.; replication latency has exceeded a maximum threshold value |
| AlertTypeConnListModified | By network admin.; human operator has edited the configuration container, especially the replication topology |
| AlertTypeDCServRecordsMissing | By network/site admin.; server record for a service on a DC is missing, directory is not synchronized with the DNS |
| AlertTypeDCRecordsIncorrect | By network/site admin.; record that identifies the DC is incorrect |
| AlertTypeIPAddressInvalid | By network/site admin.; a DC record points to an incorrect Internet protocol address |
| AlertTypeSchemaInconsistant | By network admin.; the description of the structure (records and indecies) of a database describing the directory is inconsistent |
| AlertTypeDCNotRunning | By site admin.; a domain controller is not responding to a Ping |

TABLE 1-continued

| ALERT | DESCRIPTION |
| --- | --- |
| AlertTypeDSNotRunning | By site admin. or domain analyzer; directory service is not responding properly |
| AlertTypeDSNotResponding | By site admin. or domain analyzer; directory service is not responding properly |
| AlertTypeRIDPoolRunningLow | By domain analyzer; insufficient number of relative identifiers available for identifying securable objects |
| AlertTypeCPUTooHigh | By domain analyzer; number of non-idle CPU cycles has exceeded a threshold value |
| AlertTypePageFaultTooHigh | By domain analyzer; unexpected requirement to read a page from disk into memory |
| AlertTypeCacheHitTooLow | By domain analyzer; disk cache hit rate is below a threshold value |
| AlertTypeLowDiskSpaceSYS | By domain analyzer; the free space on the sys volume is below a threshold value |
| AlertTypeLowDiskSpaceDIR | By domain analyzer; the free space on the volume used by the directory service is below a threshold value |
| AlertTypeKCCDisabled | By domain analyzer; knowledge consistency checker of WINDOWS NT directory service that verifies replication topology has been disabled by an operator |
| AlertTypeACLQueueTooLong | By domain analyzer; access control list queue is not being serviced in a timely manner, probable replication problems |
| AlertTypeSMBConnTooHigh | By domain analyzer; use of server for file transfer may impede use for directory service, inferred from server message block (SMB) protocol variable |
| AlertTypeBackupNotCompletedRecent | By domain analyzer or network/site admin.; backup of directory critical information has not been completed within a threshold time value |
| AlertTypeDITFragmented | By domain analyzer; files of directory information table do not allow efficient access |
| AlertTypeLDAPLoadTooHigh | By domain analyzer; number of LDAP lookups/writes in a predetermined time interval has exceeded a threshold value, too many queries to directory service |
| AlertTypeLDAPResponseTooSlow | By domain analyzer or network/site admin.; an operator/automatic requested test lookup of an LDAP object was not timely performed |

TABLE 1-continued

| ALERT | DESCRIPTION |
| --- | --- |
| AlertTypePropDroppedSyncHigh | By domain analyzer; replication is proceeding in an inefficient fashion, property of a replicated object was dropped resulting in synchronization count exceeding a threshold value |
| AlertTypeDNSServerNotRunning | By network/site admin.; a DNS server not responding to a Ping |
| AlertTypeDNSServiceNotResponding | By network/site admin.; DNS service not responding |
| AlertTypeDNSLameDelegation | By network/site admin.; a delegation of authority for the DNS hierarchy is invalid |
| AlertTypeNoDCAvailableForDomain | By site admin.; no DC will respond for the specified domain |
| AlertTypeDynamicUpdatesNotReplicating | By site admin.; updates to the DNS hierarchy are not replicating |
| AlertTypeNoGCForSite | By site admin.; global catalog maintained by directory service is not available |
| AlertTypeNotEnoughGCForSite | By site admin.; number of global catalog services is insufficient to meet requests |

Site administrator 420 performs, inter alia, the following functions programmed using conventional object oriented design methodologies including encapsulation to define scope of references, functional overloading, polymorphism, and inheritance. Each site administrator in computer network 100 subscribes to and aggregates data from domain analyzers at the same site as the respective site administrator. Each site administrator provides configuration details to initialize and control domain controllers and domain analyzers at the respective site. Each site administrator monitors (as described above) conditions that are optimally monitored or analyzed at the site for obtaining data of reliable accuracy (rather than copied from a possibly unauthorized or out of date source) and for limiting network traffic as discussed above. For example, the directory service at a site may maintain a global catalog (GC) containing selected portions of the (enterprise wide) directory. Analysis of the GC is best done at the site raising alerts described in Table 1, including notice of the absence or corruption of the GC.

Network administrator 418 performs, inter alia, the following functions programmed using conventional object oriented design methodologies including encapsulation to define scope of references, functional overloading, polymorphism, and inheritance. In an alternate configuration of computer network 100, redundant network administrator services perform in parallel for increased prediction capability and for flexibility of operations by more than one human operator possibly at different physical locations. Each network administrator preferably subscribes to and aggregates data from every site administrator in computer network 100. In addition, network administrators export data and support conventional protocols for other maintenance objectives using, for example, SNMP and WBEM. In a preferred variation, each component of the monitor service and the client GUI are supported as users with privileges appropriate to the scope of administration each is to perform. Consequently, network administrator 418 enforces the security measures implied by such separate user accounts. Each network administrator monitors (as described above) conditions that are optimally monitored or analyzed with reference to the (enterprise wide) directory and net model 416 for obtaining data of reliable accuracy (rather than copied from a possibly unauthorized or out of date source) and for limiting network traffic as discussed above. For example, monitoring of network conditions and analysis of replication operations (extent, completeness, consistency, resulting network load, frequency, and duration, i.e. latency of out of date copies) are preferably done at the enterprise server, thereby raising alerts, described in Table 1, including notice of replication latency exceeding a threshold value.

In general, alerts are raised when a value obtained by monitoring (perhaps several variables) and analysis exceeds a predetermined limit value (a threshold). Threshold values are set by the human operator, or preferrably by analysis performed by network administrator 418.

For example, by monitoring any of the above mentioned performance indicators for a period of time, a range of values, squares of the values, and count of the values may be obtained. Based on these intermediate values, a variance or standard deviation may be calculated. In a preferred variation of network administrator 418, the standard deviation of a performance indicator is used to determine the center of a band of acceptable values of the indicator. In other words a minimum and a maximum threshold may be calculated and a suitable alert raised (too high, or too low) when the respective out of band condition occurs. By periodically recalculating a variance, changes in network configuration (such as addition or relocation of often accessed objects) are accounted for without manual intervention. Unnecessary alerts are avoided and conditions which may not have raised an alert now do raise an alert as a consequence of automatically adjusting appropriate threshold values.

A network administrator also prescribes schedules for operations to be performed by site administrators and domain analyzers in computer network 100. For example, if a network link is available only during a portion of selected days each week or month, a suitable schedule for establishing communication restricted to such times is designated by a network administrator and communicated to the site administrators according to configuration details in the directory. A schedule that is entered on one server (e.g. enterprise server 402) is effective to control monitoring, replicating, and model updating operations at one or more other servers (e.g. site server 404). Network tests may be performed in response to a schedule. For example, a schedule determined by a network administrator and communicated to a site administrator may be used by the site administrator to automatically initiate a plurality of directory operations (e.g. a replication, a search) or communication operations (a DNS Ping, a DC Ping, etc.). The variance of any monitored characteristic (e.g. replication latency, Ping response time measurement, etc.) may be used to update variances as discussed.

A site administrator in operation performs one or more of several methods for predicting failure in a computer network. A failure related to the unavailability of a resource requested by a user may, in general, be predicted on the basis of abnormal or inconsistent values in the site model. An inconsistency in the site model may occur, for example, when an attribute of a resource object is modified by a domain controller having responsibility of a first portion of the directory and access is attempted by a second domain controller whose local copy or replication of the directory is not up to date. The cooperation of directory services on each domain controller, site server, and enterprise server in the computer network is intended to prevent such inconsistencies. However, the occurrence of a network failure as discussed above, may permit the inconsistency to persist. On examination of the local copy of the directory by the site administrator, an incomplete replication is detected.

Figure 5:
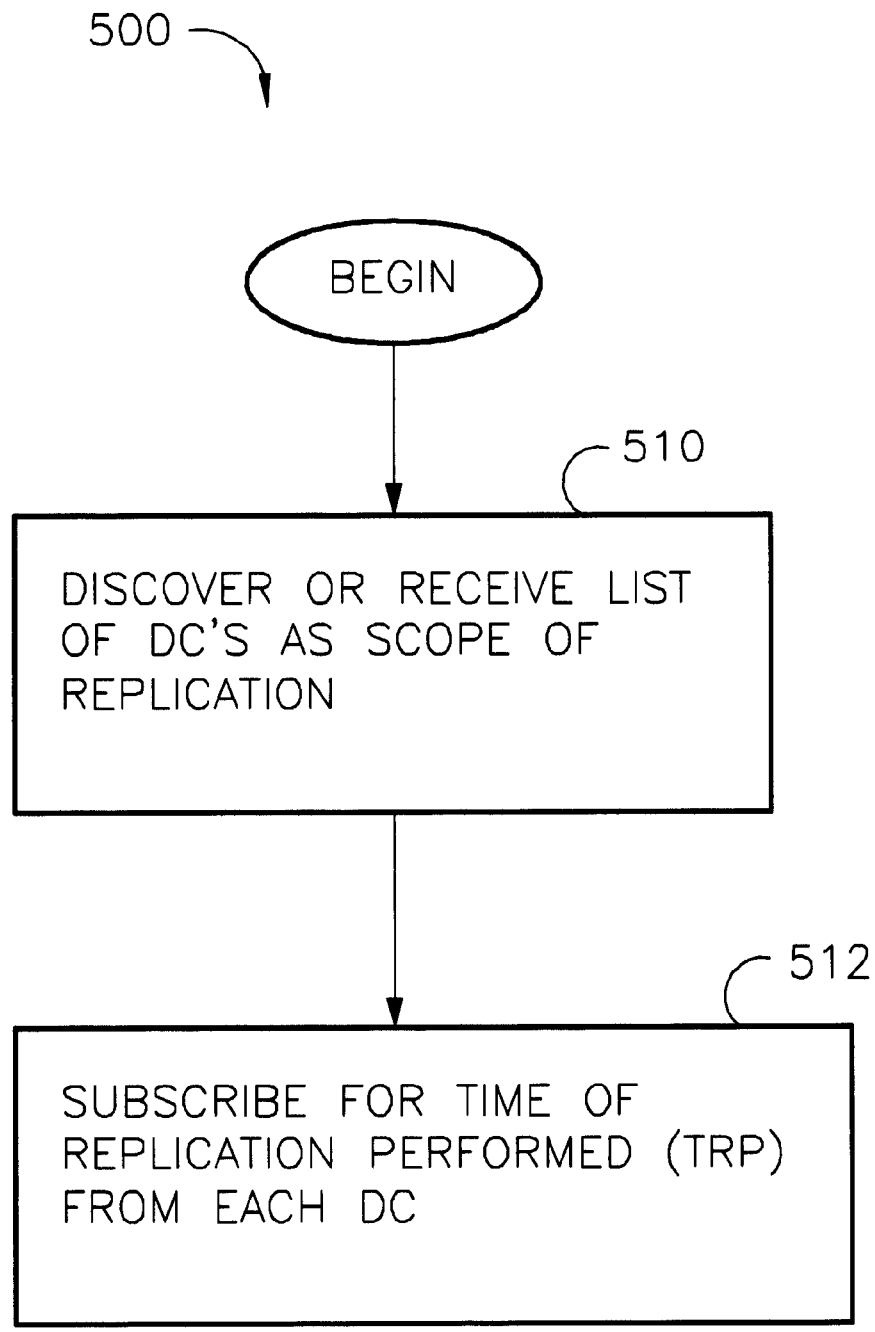
FIG. 5 is a flow chart of an initialization method performed by the Site Administrator of FIG. 4 with respect to replication operation monitoring.
Figure 6:
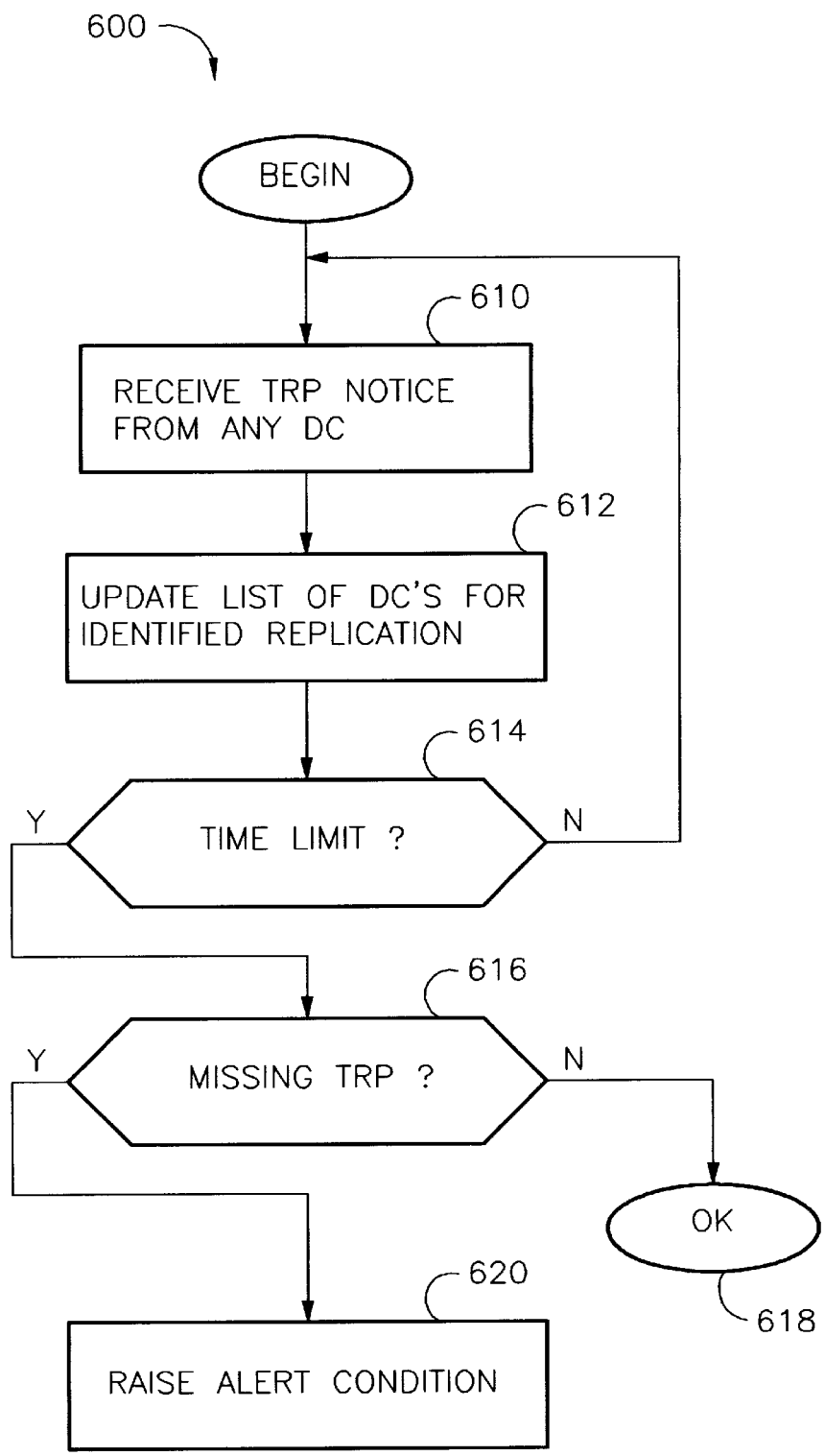
FIG. 6 is a flow chart of a method performed by the Site Administrator to detect incorrect replication operations.

For example, a method for detecting an incomplete replication as performed by a site administrator is described in FIGS. 5 and 6. In FIG. 5, method 500 begins at step 510, where the scope of the replication operation is determined either by discovery of all domain controllers that are to receive the replication, or on receipt of a list of domain controllers from the network administrator.

At step 512, the site administrator subscribes to receive from each domain controller notice of the time each replication operation is performed. Notice of a time of replication being performed (TRP) is sent by a domain controller and is received by the site administrator. At each domain controller, and on receipt of a request to subscribe for a particular notice, a process in the domain controller records the subscribing server GUID in a table and, when a change occurs to the requested information, a notice is prepared and sent to the server having the identified GUID.

In general, a subscription once received will persist until canceled. Because more than one server may have subscribed to the same information, multiple messages may be sent. The sending of multiple messages is referred to as publication.

An alert condition indicating a possible network failure may be raised in response to publication of a particular notice. For example, method 600 of FIG. 6 determines whether an alert condition should be raised. At step 610, a TRP notice of the time a replication was performed is received from any domain controller.

At step 612, the identity of the particular replication operation is determined from the notice. Operation identification is accomplished by a suitable transaction number in the message. For each identified replication, a list is created of the domain controllers within the scope of replication determined at step 510 of FIG. 5. On receipt of the TRP notice, the appropriate list is updated.

At step 614, the duration of the identified replication operation is compared to a time limit. The time limit is as prescribed in the initialization of the network monitor and may be updated by the client through the network administrator and site administrator processes. Preferably, the time limit is set initially and revised periodically according to a variance analysis as discussed above. If the time limit is not exceeded, control passes back to step 610.

If the time limit it exceeded, control passes to step 616 where the list prepared in step 612 is analyzed for completeness. If it is determined that a TRP notice has not been received from a domain controller within the scope of replication, such a notice is considered missing and control passes to step 620.

At step 620, an alert condition is raised. On the other hand, if none of the expected TRP notices are missing, control passes to step 618. At step 618, the list of domain controllers formed in step 510 or 612 may be discarded.

Figure 7:
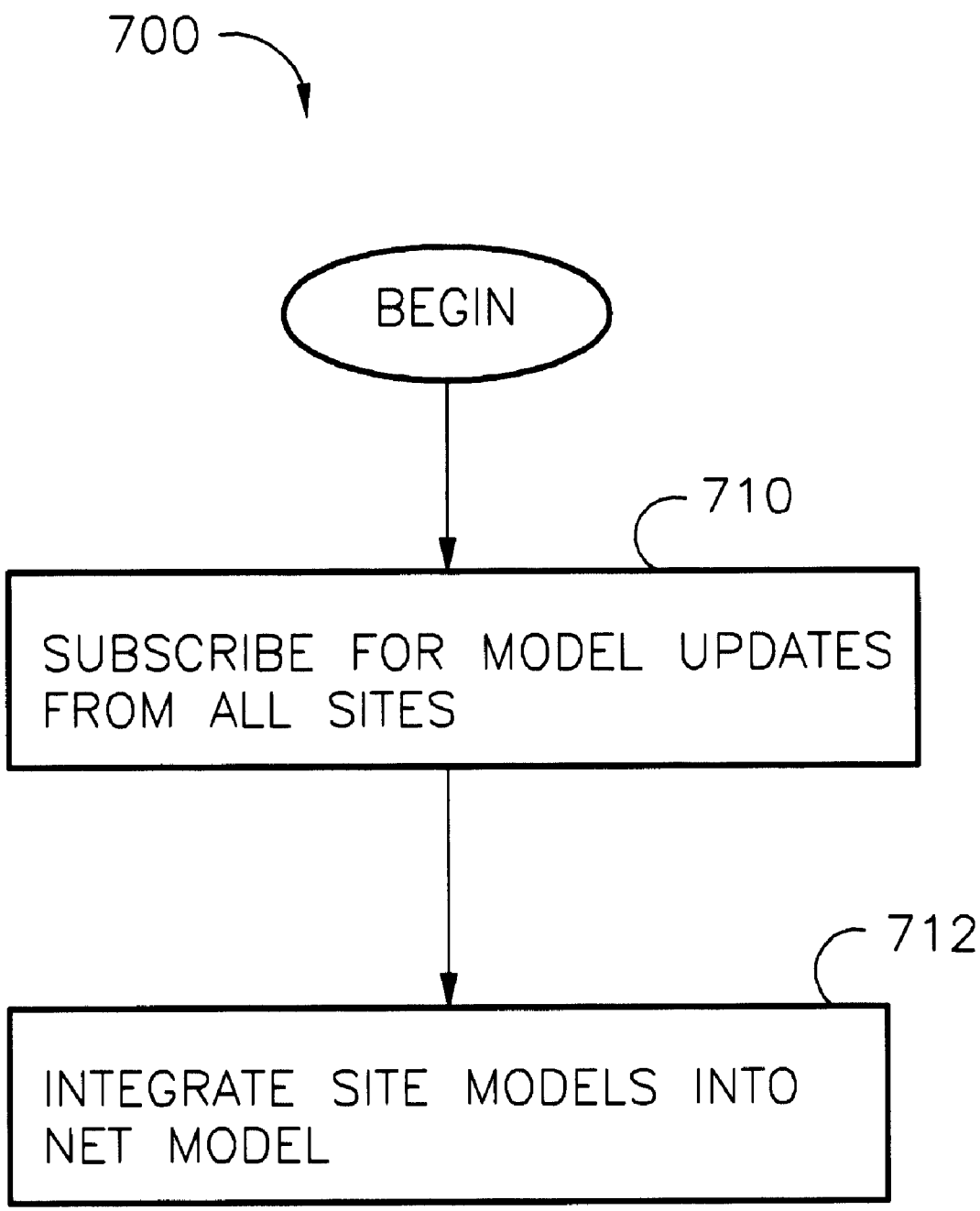
FIG. 7 is a flow chart of an initialization method performed by the Network Administrator of FIG. 1 with respect to replication operation monitoring.

An alternate method for detecting an incomplete replication operation is performed by the network administrator. Information as to the scope of all replication operations expected to occur on the computer network is maintained in the net model. On examination of the net model for inconsistencies or abnormal conditions, the network administrator may predict a failure of the network. For example, the method 700 of FIG. 7 begins at step 710 where the network administrator requests a subscription for network model updates from all sites. In response to such a subscription request, the site administrator provides a copy of the site model on a predetermined schedule. The schedule may be set by the client through the network administrator and site administrator either at initial installation or at any time thereafter.

The site administrator responds to the subscription request with publication of the site model as described above. At step 712, the network administrator integrates all received site models into the net model. Because the site model and net model have identically named variables and similar data organization, information from the site model may be added at an appropriate position in the net model. Information from a newly received site model does not necessarily replace information in the net model. Instead, information from each site model is appended to the net model, so that comparison of the information already part of the net model to each update from a received site model can be made.

Figure 8:
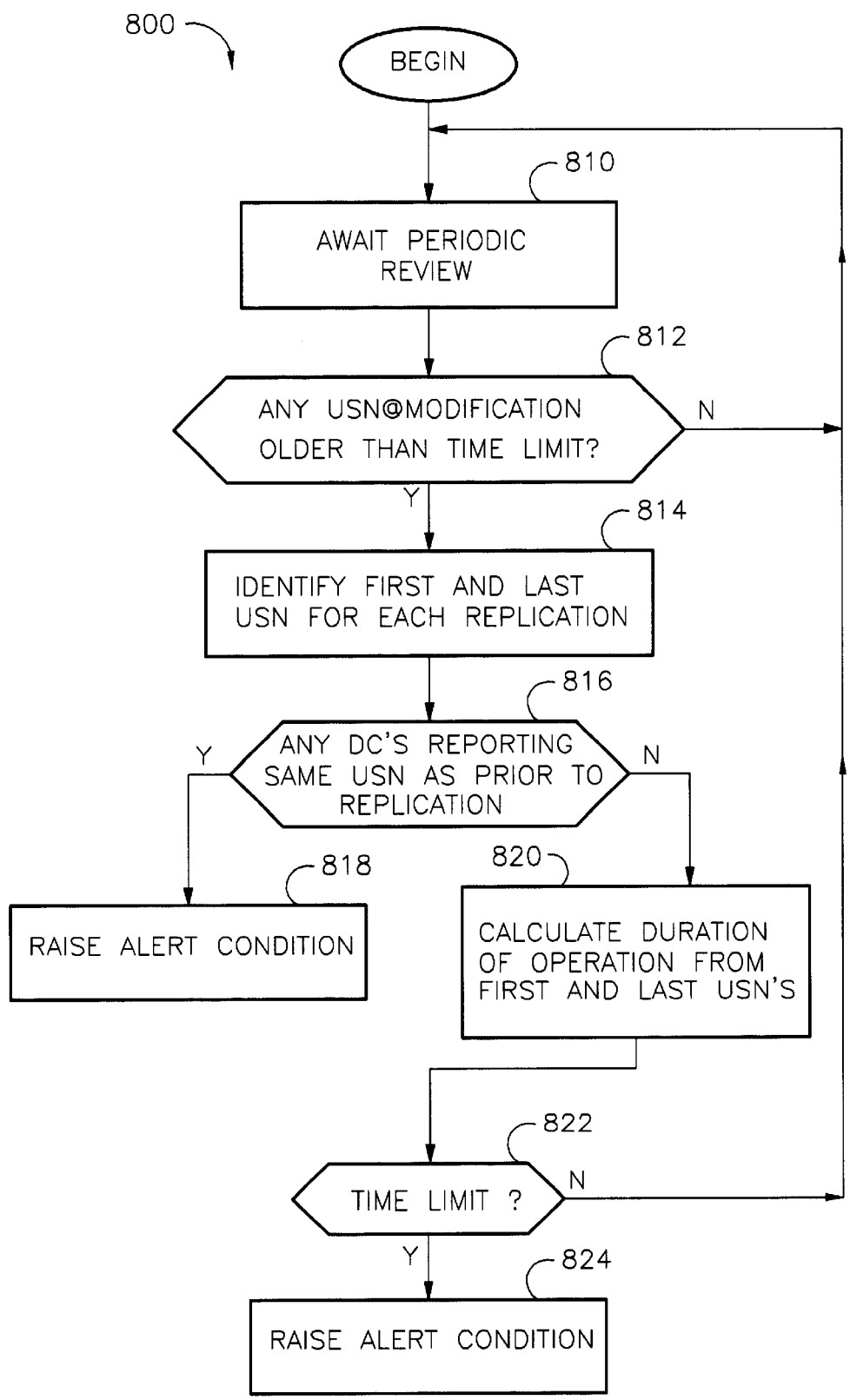
FIG. 8 is a flow chart of a method performed by the Network Administrator to detect incorrect replication operations.

The network administrator may raise an alert condition in response to the integration of site models at step 712. For example, method 800 of FIG. 8 begins at step 810 where the network administrator awaits a scheduled periodic review. When the time arrives for review of the net model for inconsistencies related to incomplete replication operations, control passes to step 812.

At step 812, an analysis is made of the net model. For each replication operation having a unique sequenced number (USN) associated with modification of an object, a comparison is made to determine whether the USN is older than a predetermined time limit. If any USN for a selected replication operation is older than the time limit, control passes to step 814. Otherwise, the replication operation is still in process and control passes to step 810.

At step 814, each replication operation is identified along with the first and last USN associated with that replication operation.

At step 816, a comparison is made between the USN as noted by the network administrator prior to the replication operation and the USN for a particular object as reported by any of the domain controllers within the scope of the replication. If any domain controller reports the same USN as prior to replication, control passes to step 818 where an alert condition is raised. On the other hand, if all domain controllers report a modified USN after the USN indicated as prior to replication operation, then control passes step 820.

At step 820, the duration of the replication operation is calculated by taking the difference between the time of the last USN and the time of the first USN.

At step 822, if the duration calculated in step 820 exceeds a time limit, an alert condition is raised at step 824. Otherwise, control passes to step 810 to await another periodic review.

In general, an alert need not be immediately propogated to the network administrator (e.g. if it arises on a domain analyzer). Scheduled holds for recurring alerts may avoid excessive network traffic.

An alert may be raised in response to replication latency in combination with an excessive number of modifications to an object attribute in a predetermined period of time.

Figure 9:
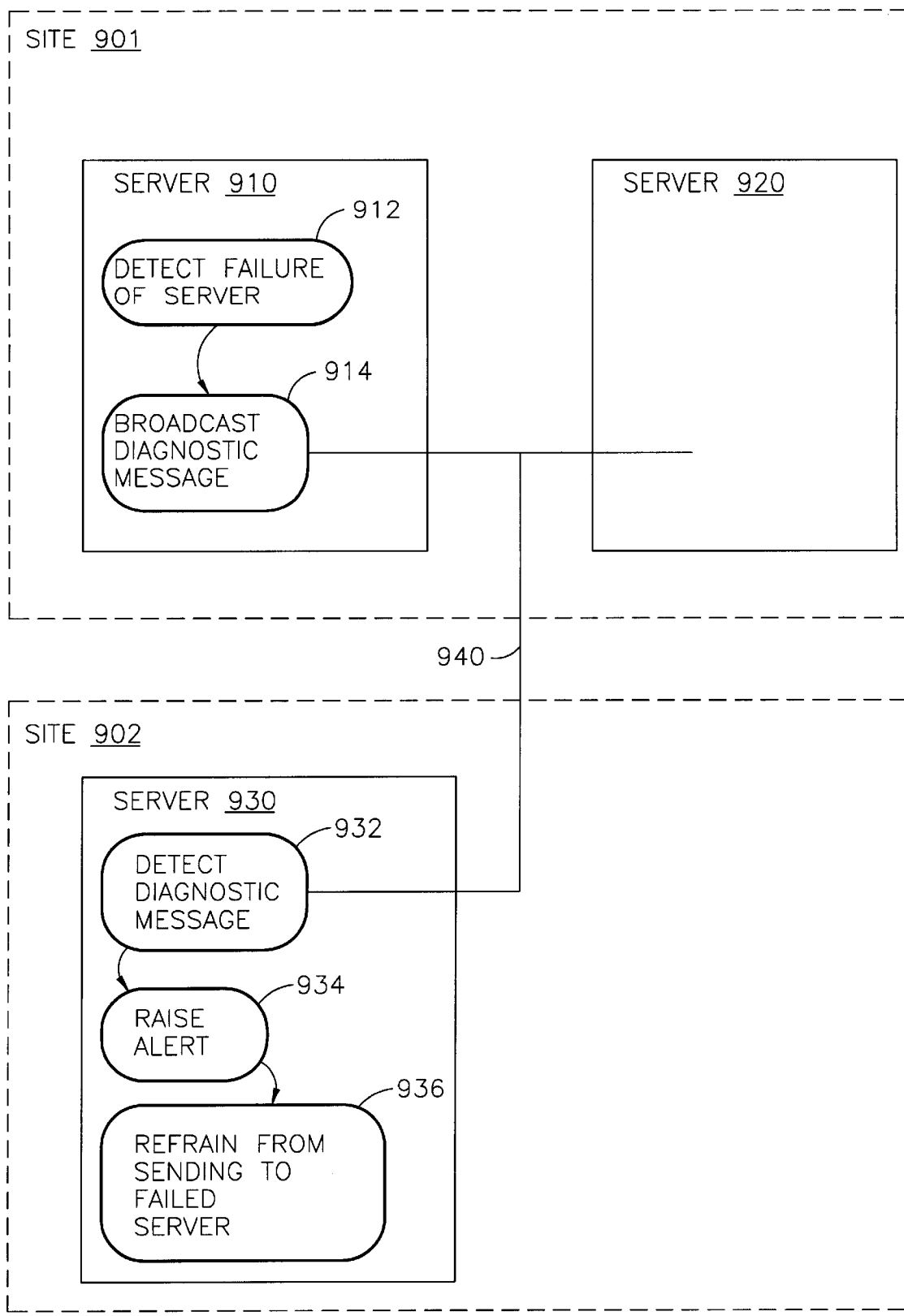
FIG. 9 is a functional block diagram of a computer network according to various aspects of the present invention.

According to various aspects of the present invention, an alert condition may be raised at a site other than the site that initiates a diagnostic message. For example, sites 901 and 902 are coupled by network 940 of FIG. 9. Server 910 and server 920 are located at site 901. Server 930 is located at site 902. Server 910 may detect failure of another server using process 912. Process 912 may include any conventional server failure detection technique or techniques as discussed above. Process 912, on detection of a failure in server 920, may activate process 914 to broadcast a diagnostic message on network 940. Server 930 may detect, via process 932, the broadcast of the diagnostic message and activate process 934 to raise an alert condition at site 902. Process 934 may also activate process 936 to cause server 930 to refrain from sending any further messages on network 940 directed to a server that is recognized as having failed (e.g., server 920).

The foregoing description discusses preferred embodiments of the present invention which may be changed or modified without departing from the scope of the present invention as measured by the claims.

What is claimed is:

1. A programmed data storage device comprising indicia of a method for predicting a failure in a computer network having a distributed directory, the method comprising:
   receiving a first message that indicates beginning of replication of a portion of the directory, and identifies a first time;
   receiving a second message that indicates completion of replication of the portion of the directory, and identifies a second time; and
   raising an alert condition in response to comparing a first threshold value and a difference between the second time and the first time.

2. The device of claim 1 wherein the second message originates from a server of the computer network, the server having a stored object, and the method further comprises:
   receiving a third message that indicates a number of modifications of an attribute of the object over a predetermined period of time; and
   raising the alert condition in further response to at least one of:
   (a) comparing the first threshold and the difference between the second time and the first time; and
   (b) comparing the number and a second threshold.

3. The device of claim 1 wherein the second message originates from a server of the computer network, the server having storage for at least a portion of the directory, and the method further comprises:
   receiving a third message that indicates a number of modifications of the portion of the directory over a predetermined period of time; and
   raising the alert condition in further response to at least one of:
   (a) comparing the first threshold and the difference between the second time and the first time; and
   (b) comparing the number and a second threshold.

4. The device of claim 1 wherein the second message originates from a server of the computer network, the server having a system volume, and the method further comprises:
   receiving a third message that indicates an amount of free space on the system volume; and
   raising the alert condition in further response to at least one of:
   (a) comparing the first threshold and the difference between the second time and the first time; and
   (b) comparing the amount and a second threshold.

5. The device of claim 1 wherein the second message originates from a server of the computer network, the server having a volume for storage of a portion of the distributed directory, and the method further comprises:
   receiving a third message that indicates an amount of free space on the volume; and
   raising the alert condition in further response to at least one of:
   (a) comparing the first threshold and the difference between the second time and the first time; and
   (b) comparing the amount and a second threshold.

6. The device of claim 1 wherein the method is performed on a first server of the computer network; the first message is received from a second server of the computer network; and the second message is received from the second server.

7. The device of claim 1 wherein the method further comprises:
   monitoring the distributed directory to identify a plurality of directory operations;
   determining a plurality of measurements, the plurality comprising a respective measurement of a quantitative characteristic for each identified directory operation; and
   determining the first threshold in accordance with a variance comprising the plurality of measurements.

8. The device of claim 5 wherein the method further comprises initiating the plurality of directory operations.

9. The device of claim 5 wherein the plurality of directory operations comprises a replication operation.

10. The device of claim 7 wherein the plurality of directory operations comprises a search operation.

11. A programmed data storage device comprising indicia of a method for predicting a failure in a computer network having a distributed directory service, the method comprising:

monitoring directory operations of the distributed directory service to determine a duration of a replication; and raising an alert condition in response to comparing a first threshold value and the duration.

12. The device of claim 11 wherein the method further comprises:

determining an extent of a resource of a server that receives the replication, the extent responsive to the replication; and raising the alert condition in further response to at least one of:

(a) the first threshold value and the duration; and
(b) comparing a second threshold value and the extent.

13. The device of claim 12 wherein the resource comprises capacity to assign a relative identifier for securing an object, assignment being from unassigned relative identifiers, and the extent comprises a quantity of available relative identifiers for securing objects.

14. The device of claim 12 wherein the resource comprises availability of CPU cycles and the extent comprises a quantity of non-idle CPU cycles.

15. The device of claim 12 wherein the resource comprises availability of memory and the extent comprises a quantity of page faults over a period of time.

16. The device of claim 12 wherein the resource comprises availability of cache memory and the extent comprises a quantity of cache hits during a period of time.

17. The device of claim 12 wherein the resource comprises a system volume and the extent comprises free space on the system volume.

18. The device of claim 12 wherein the resource comprises a volume providing storage for at least a portion of the replication and the extent comprises free space on the volume.

19. The device of claim 12 wherein the resource comprises a capacity to access objects of the replication and the extent comprises a length of an access control list queue.

20. The device of claim 12 wherein the resource comprises a capacity to respond to directory accesses and the extent comprises a rate of directory accessing.

21. The device of claim 12 wherein the resource comprises a capacity to respond to directory lookups and the extent comprises a rate of directory lookups.

22. The device of claim 12 wherein the method further comprises initiating a plurality of replication operations to be monitored.

23. The device of claim 11 wherein the method further comprises initiating a plurality of replication operations to be monitored.

24. The device of claim 11 wherein monitoring operations comprises receiving from an operating system indicia that a directory operation was performed.

25. The device of claim 11 wherein monitoring operations comprises receiving from a network indicia that a directory operation was performed.

26. The device of claim 11 further comprising:
monitoring the distributed directory to identify a plurality of directory operations;

determining a plurality of measurements, the plurality comprising a respective measurement of a quantitative characteristic for each identified directory operation; and determining the first threshold in accordance with a variance comprising the plurality of measurements.

27. The device of claim 26 wherein the method further comprises initiating the plurality of directory operations.

28. The device of claim 26 wherein the plurality of directory operations comprises a replication operation.

29. The device of claim 26 wherein the plurality of directory operations comprises a search operation.

30. A programmed data storage device comprising indicia of a method for administering a computer network, the computer network comprising a monitor service and a distributed directory service, the monitor service having an alert condition threshold value, the method comprising:

monitoring the directory service to identify a plurality of directory operations;

determining a plurality of measurements, the plurality comprising a respective measurement of a quantitative characteristic for each identified directory operation; and determining the threshold value in accordance with a variance comprising the plurality of measurements.

31. The device of claim 30 wherein the method further comprises initiating the plurality of directory operations.

32. The device of claim 30 wherein the plurality of directory operations comprises a replication operation.

33. The device of claim 30 wherein the plurality of directory operations comprises a search operation.

34. A method for predicting a failure in a computer network, the method comprising:

detecting, at a first server at a first site, a failure of a second server at the first site;

broadcasting a diagnostic message from the first server, the diagnostic message to be answered by the second server;

raising an alert condition at a second site in response to detecting the diagnostic message at the second site.

35. The method of claim 34 wherein the alert condition is raised by a third server and the method further comprises, in response to the alert condition, refraining from sending from the third server a second message for the second server.

36. The method of claim 34 wherein the diagnostic message comprises a ping.

37. The method of claim 34 wherein the second server comprises a domain name service.

38. The method of claim 34 wherein the second site comprises a third server that subscribes to notices of failure from the first server and detects the diagnostic message at the second site; and the method further comprises raising the alert condition in further response to at least one of:

(a) detecting the diagnostic message; and
(b) receiving notice of failure of the second server.

39. A method for predicting a failure in a computer network having a distributed directory service, the method comprising:

determining at a first server indicia of the first server's availability for operations of the distributed directory service;

providing a notice to a second server in accordance with a subscription from the second server, the notice being in accordance with the indicia of availability; and raising at the second server an alert condition in accordance with a threshold value and at least a portion of the notice.

40. The method of claim 39 wherein the indica of availability comprises a value of an SMB protocol variable.

41. The method of claim 40 wherein the indicia of availability comprises a time that at least a backup was made of at least a portion of the distributed directory.

42. The method of claim 40 wherein the indicia of availability corresponds to the extent of fragmentation of a directory information table.

43. A programmed data storage device comprising indicia of a method for predicting a failure in a computer network having a distributed direcory service, the method comprising:

forming a list of domain controllers;

subscribing to each listed domain controller to receive notice comprising time of a particular replication being performed;

receiving a plurality of notices during a time period;

determining that a notice from a listed domain controller was not received; and raising an alert condition in response to the determinination.

44. The device of claim 43 further comprising:

sending a plurality of pings and making a plurality of measurements, a measurement being made for each ping, the measurement corresponding to a delay from a respective time a ping is sent to a respective time a response is received;

determining the time period in accordance with a variance comprising the plurality of measurements.

45. The device of claim 44 wherein the ping response is received from at least one of a listed domain controller and a server comprising a domain name service.

46. The device of claim 43 wherein the method further comprises:

initiating a plurality of directory operations and making a plurality of measurements, a measurement being made for each directory operation corresponding to a duration of the directory operation;

determining the time period in accordance with a variance comprising the plurality of measurements.

47. The method of claim 46 wherein the plurality of directory operations comprises at least one of a replication and a search.

* * * * *

UNITED STATES PATENT AND TRADEMARK OFFICE
CERTIFICATE OF CORRECTION

PATENT NO.   : 6,249,883 B1
DATED        : June 19, 2001
INVENTOR(S)  : Cassidy et al.

It is certified that error appears in the above-identified patent and that said Letters Patent is hereby corrected as shown below:

<u>Column 18,</u>
Line 59, should read:
8. The device of claim 7 wherein the method further comprises initiating the plurality of directory operations.

Line 61, should read:
9. The device claim 7 wherein the plurality of directory operations comprises a replication operation.

Signed and Sealed this

Twenty-third Day of December, 2003

JAMES E. ROGAN
*Director of the United States Patent and Trademark Office*